Dec. 14, 1926.

F. G. WHITTINGTON 1,610,639

SIGNALING ODOMETER.

Filed March 20, 1925

Witness.
S. T. McKnight

Inventor.
Frederik G. Whittington.
by Burton & Burton
his Attorneys.

Patented Dec. 14, 1926.

1,610,639

UNITED STATES PATENT OFFICE.

FREDERIK G. WHITTINGTON, OF EVANSTON, ILLINOIS, ASSIGNOR TO STEWART-WARNER SPEEDOMETER CORP., OF CHICAGO, ILLINOIS, A CORPORATION OF VIRGINIA.

SIGNALING ODOMETER.

Application filed March 20, 1925. Serial No. 16,913.

The purpose of this invention is to provide in and in connection with a travel indicating instrument mounted upon a vehicle for registering travel by which the driver may be advised of attentions required from time to time according to the mileage travel of the vehicle by the motor or running gear of the vehicle, and being able to interpret said advices. It consists in the elements and features of construction shown and described as indicated in the claims.

In the drawings:—

Figure 1:
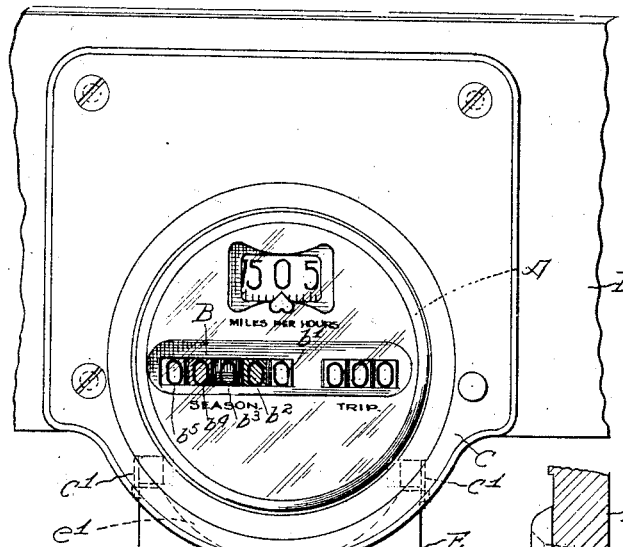
Figure 1 is a front elevation of a travel registering instrument constructed according to and equipped with parts of this invention, shown mounted upon the instrument board of a vehicle.
Figure 3:
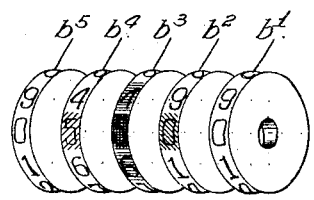
Figure 3 is a perspective dissected view of the dials of the mileage registering train.
Figure 4:
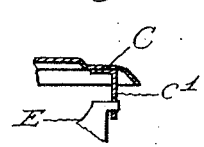
Figure 4 is a detail section at the line 4—4 on Figure 2.

The drawings show a customary form of combined instrument comprising speedometer and odometer mechanisms and dials, the same being attached by means of a mount to the instrument board of the vehicle to be served. The instrument casing is shown at A. C is the mount. D is the instrument board. The instrument casing, A, is carried in the mount in the usual manner being inserted through a central opening so that the mount constitutes a flange, being substantially in the plane of the face of the instrument. The dials, $b^1$, $b^2$, $b^3$, $b^4$ and $b^5$, of the total mileage registering train, B, of the odometer, have certain numeral areas distinctly marked for indicating the mileage periods at which attention is required by the vehicle motor, running gear or other parts. This distinctive marking, according to well known usage, consists in differently coloring the several numeral areas corresponding to the mileages at which the different attentions are required respectively. Thus the tens dial, $b^2$, has at the numeral area which will arrive at the sight opening upon the completion of each 100 miles, green marking as indicated by the conventional hatching on Figures 1 and 3. The hundreds dial, $b^3$, has each alternate numeral area which will arrive at the sight opening upon the completion of any multiple of 200 miles travel, colored blue, as indicated by the hatching in Figure 3, and this dial has also the numeral areas which will arrive at the sight opening upon the completion of 500 miles distinguished by yellow markings, as indicated by the hatching in Figures 1 and 3, and it has also the area which will arrive at the sight opening upon the completion of 1000 miles distinguished by red markings, one-half of this area being red and the other half yellow, as may be understood from the hatching in Figure 1. The thousands dial, $b^4$, has the numeral areas which will arrive at the sight opening upon the completion of each 5000 miles distinguished by purple or brown marking.

In order that the driver may interpret these distinguishing markings upon the numeral dials in accordance with the warning which they are designed to give and the attention to the vehicle or any part thereof which is required at the mileage indicated, there is attached to the instrument an interpretive chart, E, having imprinted prominently thereon the several color-markings adjacent to the interpretation thereof, that is a textual statement of the attentions which are required upon the arrival at the sight opening of the markings respectively upon the dials indicating the mileage travel by reason of which the attention is required.

Figure 2:
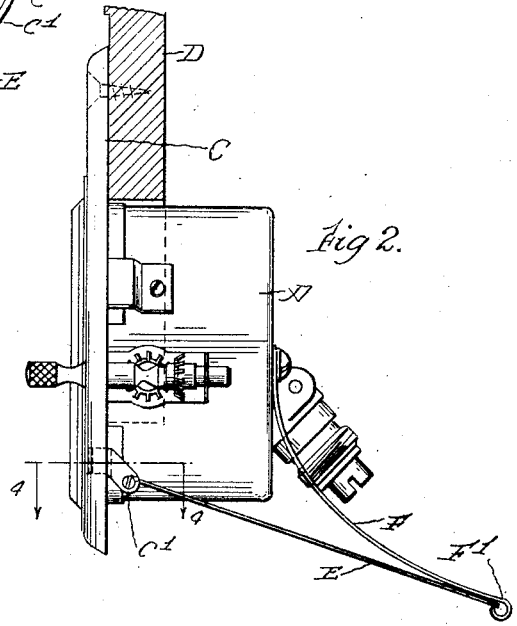
Figure 2 is a side elevation of the instrument shown in Figure 1, the instrument board being shown in section.

This chart is a relatively stiff metal plate or panel which is pivotally suspended from the instrument, the pivotal connection being most conveniently made with the mount, C, at the flange portion thereof at the under side of the instrument where pivotal lugs, $C^1$, are provided, to which the upper end of the panel, E, is attached. In order that the panel may be swung back out of display position, so as not to inconvenience the driver in the intervals between the warnings which the device is intended to give, and by reason of which the driver will consult the chart, and by reason of the pivots being above the level of the lower side of the casing, the upper end of the panel is cut away or recessed between the points of its pivotal mounting as seen at $e^1$, thus accommodating the casing when the chart is swung back and up into the position shown in Figure 2. For releasably retaining the chart in this position there is provided a spring catch, F, which is a flat spring bar attached to the rear side of the casing and normally flexed to the form shown in Figure 2, so that its free end is at a position for engaging the free end of the chart when the latter is swung back out of display position, as seen at said Figure 2. And this free end of the spring catch is formed with an engaging hook, E¹, into engagement with which the free end of the chart will snap when the latter is swung back against said hook end; and when the driver desires to consult the chart it is only necessary to reach under the instrument and push back the hook end of the catch, whereupon the chart will drop by gravity out of engaging position and swing forward or be readily swung forward to position for consultation.

I claim:—

1. A device for the purpose indicated comprising in combination, a travel indicating instrument adapted to be mounted on a vehicle and connected with the running gear thereof for registering the travel of the vehicle, the distance-registering dials of said instrument having the numeral areas denoting mileages at which different attentions to the vehicle, its mechanism or parts, are required, visually distinguished by marks differentiated for said different attentions respectively, a permanent chart movably appended to the instrument exteriorly thereof, adapted to be disposed at will in sight of the attendant in charge, containing substantial duplications of said differentiated markings adjacent to definitions of said markings respectively.

2. In the construction defined in claim 1, foregoing, the chart being pivotally suspended from the lower forward side of the instrument and adapted to be folded back and up out of display position, and releasable means for holding it so folded.

3. In the construction defined in claim 1, foregoing, the chart being a relatively stiff metal panel having pivotal support at its upper end fixed with respect to the instrument casing at the forward part thereof, the releasable means being a spring member mounted fixedly upon the rear side of the casing.

4. In combination with the construction defined in claim 1, a mounting member for the same which, when the instrument is mounted thereon, constitutes a flange projecting in a plane parallel to the face of the instrument, the pivots for the chart panel being carried by said mounting member and projecting at the rear side of said flange, and laterally disposed with respect to the instrument casing, the upper end of the chart panel being recessed between the points of its pivotal connection to accommodate its rearward and upward swing away from display position.

5. A device for the purpose indicated, comprising in combination, a travel-indicating instrument adapted to be mounted on a vehicle and connected with the running gear thereof for registering the travel of the vehicle, the distance-registering dials of said instrument having the numeral areas denoting mileages at which different attentions to the vehicle of its mechanisms or parts are required visually distinguished by marks differentiated for said different attentions respectively, a member for mounting said instrument on the vehicle from which the instrument casing is separable, and a chart of permanent character movably appended to said mounting member adapted to be disposed at will in sight of the attendant in charge, said chart containing substantial duplications of said differentiated markings and definitions of said markings adjacent to them respectively.

In testimony whereof, I have hereunto set my hand at Chicago, Illinois, this 17th day of March, 1925.

FREDERIK G. WHITTINGTON.